Patented July 11, 1939

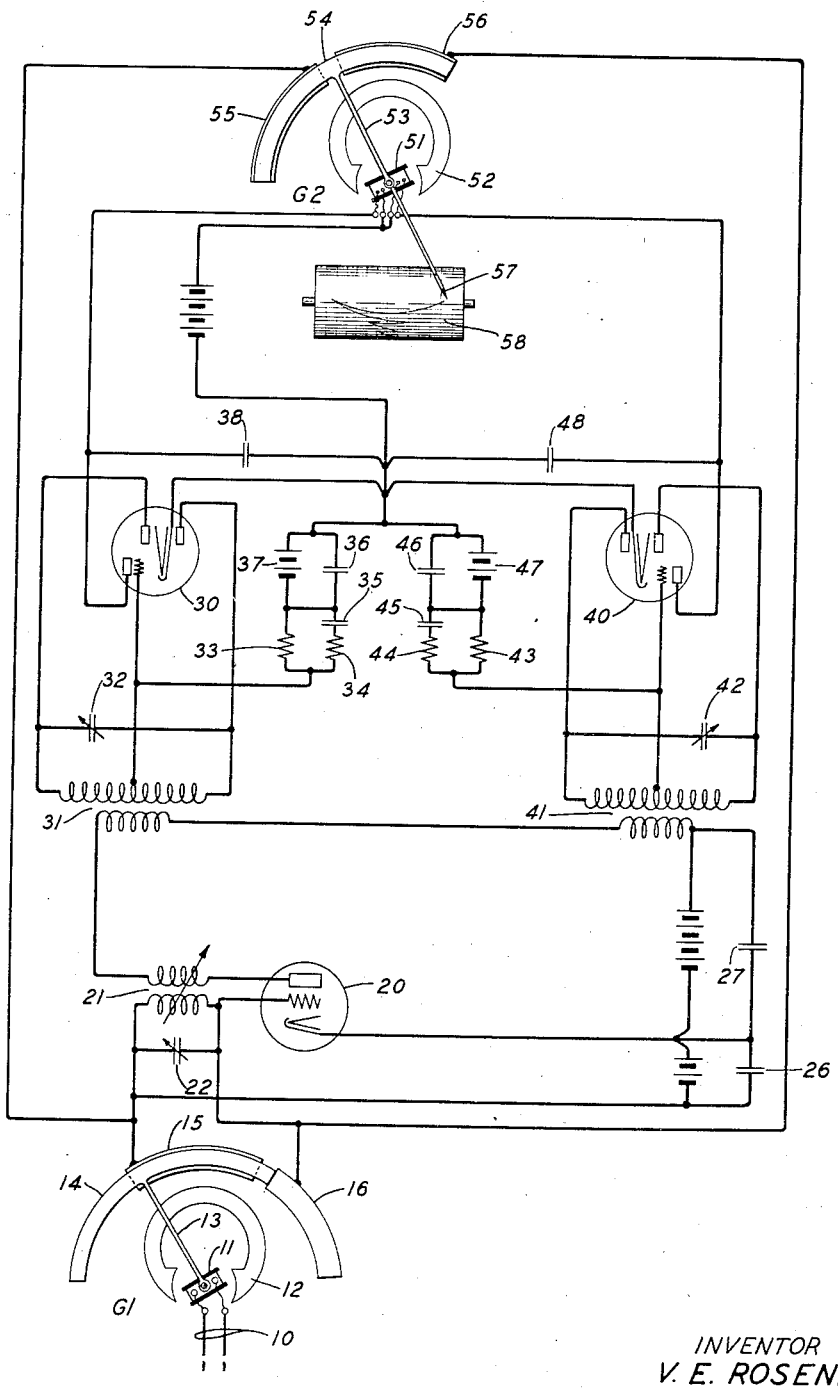

2,165,510

UNITED STATES PATENT OFFICE 2,165,510

ELECTRICAL MEASURING, RECORDING, AND CONTROL SYSTEM

Victor E. Rosene, New York, N. Y., assignor to Bell Telephone Laboratories, Incorporated, New York, N. Y., a corporation of New York Application March 27, 1936, Serial No. 71,139

8 Claims. (Cl. 177—351)

This invention relates to electrical measuring, recording and control systems.

Objects of the invention are the provision of a sensitive apparatus and system for measuring and recording a condition as represented by an electrical current, and the provision of a sensitive electrical control and balancing arrangement.

According to this invention an electrical measuring and recording system comprises an input galvanometer, the current through the winding of which represents a variable condition to be recorded, a vacuum tube oscillator, the tuning of which is varied by a change in the deflection of the input galvanometer, two vacuum tube amplifying rectifiers, and a recording galvanometer having two windings connected for differential energization by the output of the amplifying rectifiers, one of the amplifying rectifiers being most efficient at a higher frequency than that at which the other is most efficient. The movable element of each of the galvanometers carries the plate of a variable condenser, one condenser being of maximum capacity and the other of minimum capacity when the galvanometers are in zero position. Being connected in parallel, the two condensers constitute a single condenser from an electrical point of view, which controls the frequency of the oscillator, the frequency at zero deflection of the galvanometers being the average of the two frequencies at which each of the rectifiers is most efficient. Any change in the frequency of the oscillator due to deflection of the input galvanometer causes the energization of the two windings of the recording galvanometer to become unbalanced and thereby cause movement of the recording galvanometer until the oscillator has thus been restored to its normal frequency at which point the deflection of the recording galvanometer will correspond with the deflection of the input galvanometer.

A feature of the invention is an electrical system comprising two variable condensers, an oscillator, two rectifiers having maximum efficiency at different frequencies, and a galvanometer which has windings connected for differential energization by the output of the rectifiers, the movable plate of one of the condensers being carried by the movable element of the galvanometer so that any change in the capacity of the other of the condensers will cause movement of the galvanometer and change in the capacity of the associated condenser to balance or neutralize the change in the capacity of the other of the condensers. A single condenser having two separately controlled movable plates may, of course, be provided in place of separate condensers.

An electrical recording system arranged according to this invention is shown in the drawing which forms a part of this specification. Referring to the drawing, 10 represents conductors of a circuit in which the current varies with the quantity or condition to be recorded, G1 represents a receiving galvanometer, 20 is a vacuum tube oscillator, 30 and 40 are tuned detector-amplifiers, and G2 is a recording galvanometer.

The galvanometer G1 consists of a coil 11 mounted on a shaft between the poles of the permanent magnet 12. Affixed to the shaft by an arm 13 is a metal plate 14 which cooperates with the stationary metal plates 15 and 16 to form a variable condenser. This condenser has minimum capacity when the galvanometer coil is in zero position and maximum capacity when the galvanometer coil is in the position of maximum deflection. The galvanometer G2 is similar to the galvanometer G1 but is a more rugged instrument and includes a pen and paper mechanism for continuous recording. The coil 51 which consists of two differentially connected windings, is mounted on a shaft between the poles of the permanent magnet 52. The metal plate 54 affixed to the shaft of galvanometer G2 by the arm 53, cooperates with stationary plates 55 and 56 to form a variable condenser which is of maximum capacity when the galvanometer coil is in zero position and minimum capacity when the coil is in the position of maximum deflection. The end of arm 53 remote from the condenser plate 54 carries a pen 57 which traces a continuous record of the movement of the galvanometer coil on a moving paper tape 58. The movable element of galvanometer G1 restores to zero position whenever there is no current in its winding but the galvanometer G2 has no restoring spring or other biasing means and the movable element of galvanometer G2 moves only when the current in either winding exceeds the current in the other, the direction of motion depending upon which winding carries the greater current. The condenser formed by plates 14, 15, 16 of galvanometer G1 is connected in parallel with the condenser formed by plates 54, 55, 56 so that any variation in the total capacity of these condensers causes a change in the frequency of the output of oscillator tube 20. To make tube 20 function as an oscillator, the variocoupler 21 is adjusted to provide the required amount of regeneration. Variable condenser 22 enables adjustment of the normal frequency of oscillation, that is, it enables adjustment to obtain the desired frequency when there is no current in the input circuit of galvanometer G1 and galvanometer G2 is in zero position. The oscillator tube 20 has a heater type cathode. Being connected in parallel, the two condensers constitute, from an electrical viewpoint, a single condenser having two movable plates each cooperating with a pair of fixed plates. While shown schematically in the drawing as two separate condensers, the two pairs of fixed plates can be mounted on a common framework and each of the movable plates be pivoted in bearings supported by the same framework. In this case the two sets of fixed and movable plates constitute a single condenser both from an electrical and from a structural point of view.

The plate or anode circuit of oscillator tube 20 includes the lower windings of transformers 31 and 41, so that the output of oscillator 20 is impressed on the detector-amplifiers 30 and 40, each of which is a double-diode triode with a heater type cathode. The detector circuit of tube 30 includes the upper winding of transformer 31 and the cathode and two like rectifier elements in the upper part of the tube. This circuit is tuned by condenser 32 to a frequency slightly below the normal frequency of oscillator 20. The detector circuit of tube 40 includes the upper winding of transformer 41 and the cathode and two like rectifier elements in the upper part of the tube. This circuit is tuned by condenser 42 to a frequency slightly above the normal frequency of oscillator 20. The grid elements of tubes 30 and 40 are connected to the mid-point of the secondary windings of transformers 31 and 41, respectively, so that the pulsating direct current resulting from the full wave rectifying action of the diodes causes a drop in potential across resistors 33 and 43 through which the grid elements of tubes 30 and 40 are connected to the grid biasing batteries 37 and 47. Resistor 34 and condenser 35 are provided to delay change in the potential of the grid of tube 30; and resistor 44 and condenser 45 are provided to delay change in the potential of the grid of tube 40. The output circuit of tube 30 includes one winding of coil 51 of the recording galvanometer G2 and the output circuit of tube 40 includes the other winding of coil 51. These windings are differential so that with the input circuit of tube 30 tuned to a frequency as much lower than the normal frequency of oscillator 20 as the input circuit of tube 40 is tuned to a frequency higher than the normal frequency of oscillator 20, the current in the one winding of coil 51 will balance the current in the other winding and no movement of the coil will result.

As soon as there is a current in the circuit over conductors 10 through the coil 11 of galvanometer G1, the movement of the plate 14 causes an increase of capacity between the fixed plates 15 and 16 thereby lowering the frequency of the oscillator 20. Since the detector circuit of tube 30 is tuned to a frequency lower than the normal frequency of the oscillator and the detector circuit of tube 40 to a frequency higher than the normal frequency of the oscillator, the grid potential of tube 30 will be raised and the grid potential of tube 40 lowered. The current in the anode circuit of tube 30 and the associated winding of coil 51 is thus increased and the current in the anode circuit of tube 40 and the other winding of coil 51 is decreased so that the coil 51 is deflected and plate 54 moved in the direction which decreases the capacity between fixed plates 55 and 56. As the capacity between plates 55 and 56 is decreased, the frequency of oscillator 20 increases and when the plate 54 has moved to the position in which the capacity between plates 55 and 56 has been decreased an amount equal to the aforementioned increase in capacity between plates 15 and 16 of galvanometer G1, the frequency of oscillator 20 is again normal and the currents in the two windings of coil 51 are again balanced. When the current in the coil 11 of galvanometer G1 decreases, the capacity between plates 15 and 16 decreases, the frequency of oscillator 20 is increased, the current in the anode circuit of tube 30 and associated winding of coil 51 is decreased, the current in the anode circuit of tube 40 and other winding of coil 51 is increased, and plate 54 is moved in a direction opposite to the direction of movement caused by an increase of current in the coil 11 of galvanometer G1 so as to increase the capacity between fixed plates 55 and 56. Thus, the movement of the coil of galvanometer G1 in either direction causes a reciprocal movement of the coil of the recording galvanometer G2 so that the sum of the capacity between plates 15 and 16 and the capacity between plates 55 and 56 will be a constant when the energization of the windings of coil 51 is balanced. The pen 57 of galvanometer G2 thus inscribes on the associated paper chart 58 a continuous record of the current in the circuit over conductors 10. The condenser plates associated with galvanometers G1 and G2 may have any desired shape to obtain a record on the paper chart which is linear or logarithmic with respect to the current in coil 11 of galvanometer G1.

Although batteries are shown as the sources of electrical current, any other suitable source may be substituted. The condensers 26, 27, 36, 38, 46 and 48 are connected across the batteries to by-pass alternating current.

If the current, which represents the quantity or condition to be recorded, is an alternating current, the galvanometer G1 may be replaced by an alternating current galvanometer. Furthermore, it is not necessary that the quantity or condition to be recorded be represented by an electrical current; for the shaft on which the condenser plate 14 is mounted may be mechanically controlled by the quantity or condition.

What is claimed is:

1. The combination in an electrical measuring and recording system of a first galvanometer, an oscillation generator, a variable capacitor comprising stationary and movable plates for controlling the frequency of said generator, a recording galvanometer having differential windings, and two differently tuned rectifiers coupled to the output of said generator for energizing the windings of said recording galvanometer, each of the movable elements of said galvanometers carrying a different movable plate of said capacitor.

2. The combination in an electrical measuring and recording system of a first galvanometer, an oscillator, a variable condenser comprising stationary and movable plates for controlling the frequency of said oscillator, two differently tuned rectifiers coupled to the output of said oscillator, and a recording galvanometer having its windings connected for differential energization by the output from said rectifiers, each of said galvanometers carrying a movable plate of said condenser, movement of said first galvanometer being effective to change the capacity of said condenser, the resulting change in the frequency of the oscillator being effective to cause movement of the recording galvanometer sufficient to neutralize the change in the capacity of said condenser caused by the movement of said first galvanometer.

3. The combination in an electrical measuring and recording system of a first galvanometer, an oscillating tube generator, a variable capacitor comprising stationary and movable plates for controlling the frequency of said generator, a recording galvanometer having differential windings, two ionic rectifiers coupled to the output of said generator for energizing the windings of said recording galvanometer, one of said rectifiers being tuned to a frequency above and the other to a frequency below the normal frequency of said generator, each of the movable elements of said galvanometers carrying a different movable plate of said capacitor.

4. The combination in an electrical measuring and recording system of a vacuum tube oscillating at a desired normal frequency, a recording galvanometer, the coil of said galvanometer having two differentially connected windings, two ionic rectifiers coupled to the output of said oscillator, the output circuit of one rectifier including one of said windings and the output circuit of the other rectifier including the other of said windings, two variable condensers connected in parallel in the grid circuit of said oscillator, and means for varying the capacity of one of said condensers in accordance with variations in the condition to be recorded, the capacity of the other of said condensers varying with the position of the coil of said galvanometer.

5. The combination in an electrical recording system of a recording galvanometer, a condenser having a movable plate set in accordance with the condition to be recorded and another movable plate carried by the coil of said galvanometer, a thermionic oscillator, the frequency of which is controlled by said condenser, and two rectifiers connected to the oscillator, one rectifier being tuned to a frequency slightly above that of the normal frequency of the oscillator and the other being tuned to a frequency as much below the normal frequency of the oscillator as the one is tuned above the normal frequency of the oscillator, the coil of said galvanometer having two differentially connected windings one in the output circuit of one of said rectifiers and the other in the output circuit of the other of said rectifiers.

6. The combination in an electrical recording system of a recording galvanometer having a coil with two differentially connected windings, a more sensitive galvanometer the coil of which is subjected to a current which varies in magnitude in accordance with the magnitude of the condition to be recorded, a variable condenser, the movable plate of which is carried by the coil of the recording galvanometer, another variable condenser the movable plate of which is carried by the coil of said more sensitive galvanometer, an oscillatory generator, said condensers being connected in parallel to control the frequency of said generator, and tuned circuits separately connecting the generator to the windings of the recording galvanometer, the tuning of one of said circuits being fixed somewhat above the normal frequency of the generator and the tuning of the other being fixed an equal amount below the normal frequency of the generator.

7. The combination in an electrical recording system of a recording galvanometer having a coil with two differentially connected windings, a variable condenser the movable plate of which is carried by said coil, another condenser, the setting of the movable plate of which is controlled by the condition to be recorded, the capacity of the last-mentioned condenser being a minimum when the magnitude of the condition to be recorded is minimum, and the capacity of the first-mentioned condenser being a maximum when a minimum condition is being recorded, a source of oscillating current, the frequency of which is controlled by said condensers in parallel, and tuned circuits separately connecting said source to the windings of the recording galvanometer, the frequency of one of said circuits being fixed slightly above the normal frequency of said source and the frequency of the other of said circuits being fixed an equal amount below the normal frequency of said source, any change in frequency of said source due to variation in the capacity of said other condenser being effective to cause movement of the coil of the recording galvanometer and movable plate of the first-mentioned condenser until the frequency of said source is restored to normal.

8. The combination in an electrical measuring system of a galvanometer having two differential windings, an oscillator and two rectifiers controlling the movement of said galvanometer, one of said rectifiers being tuned to a first frequency and connected to one of said windings and the other of said rectifiers being tuned to a second frequency and connected to the other of said windings of the galvanometer, said first frequency being higher than the normal frequency of said oscillator and said second frequency being as much lower than said normal frequency as said first frequency is higher than said normal frequency, a condenser comprising two movable plates for controlling the frequency of said oscillator, the position of one of said movable plates being controlled by said galvanometer, and means for varying the position of the other of said movable plates, movement of said other plate being effective to change the frequency of said oscillator in one direction and the resulting movement of said galvanometer and controlled plate being effective to change the frequency of said oscillator in the other direction.

VICTOR E. ROSENE.